United States Patent
Hong

(10) Patent No.: US 8,599,289 B2
(45) Date of Patent: Dec. 3, 2013

(54) METHOD AND DEVICE FOR IMAGE NOISE COMPENSATION WITH IMAGE ENHANCEMENT

(75) Inventor: Li Hong, San Diego, CA (US)

(73) Assignee: Nikon Corporation, Tokyo (JP)

( * ) Notice: Subject to any disclaimer, the term of this patent is extended or adjusted under 35 U.S.C. 154(b) by 398 days.

(21) Appl. No.: 13/002,018

(22) PCT Filed: Sep. 24, 2008

(86) PCT No.: PCT/US2008/077578
§ 371 (c)(1),
(2), (4) Date: Dec. 29, 2010

(87) PCT Pub. No.: WO2010/036250
PCT Pub. Date: Apr. 1, 2010

(65) Prior Publication Data
US 2011/0115951 A1 May 19, 2011

(51) Int. Cl.
*H04N 5/217* (2011.01)
*G06K 9/40* (2006.01)
(52) U.S. Cl.
USPC .......................................... 348/241; 382/260
(58) Field of Classification Search
USPC .......................................... 348/241; 382/260
See application file for complete search history.

(56) References Cited

U.S. PATENT DOCUMENTS

| | | | |
|---|---|---|---|
| 7,257,271 B2 * | 8/2007 | Adams et al. ................. | 382/275 |
| 7,457,477 B2 * | 11/2008 | Petschnigg et al. ........... | 382/274 |
| 7,702,173 B2 * | 4/2010 | Gao et al. ....................... | 382/260 |
| 7,889,949 B2 * | 2/2011 | Cohen et al. ................... | 382/299 |
| 8,184,926 B2 * | 5/2012 | Sun et al. ....................... | 382/275 |
| 8,254,718 B2 * | 8/2012 | Bennett et al. ................. | 382/275 |
| 8,374,457 B1 * | 2/2013 | Wang et al. .................... | 382/266 |
| 2007/0098288 A1 | 5/2007 | Raskar et al. | |
| 2007/0177817 A1 | 8/2007 | Szeliski et al. | |
| 2008/0192064 A1 * | 8/2008 | Hong et al. ..................... | 345/582 |
| 2008/0232665 A1 | 9/2008 | Borsdorf | |
| 2009/0257671 A1 | 10/2009 | Fridrich et al. | |
| 2011/0097008 A1 * | 4/2011 | Cao et al. ....................... | 382/260 |

OTHER PUBLICATIONS

PCT Notification of Transmittal of International Preliminary Report on Patentability for PCT/US2008/077578 with amended claims as filed (related to present application) dated Apr. 14, 2011, Nikon Corporation.
PCT International Search Report and Written Opinion for PCT/US2008/077578 (related to present application) dated Dec. 12, 2008, Nikon Corporation.

\* cited by examiner

*Primary Examiner* — Ngoc-Yen Vu
(74) *Attorney, Agent, or Firm* — Roeder & Broder LLP

(57) ABSTRACT

A system (12) for providing an adjusted image (228) of a scene (10) from a noisy captured image (14) includes a control system (26) that provides the adjusted image (228). The control system (26) can create a de-noised image (238) from the captured image (14), determine a details layer (236) from the captured image (14), and combine information from the details layer (236) with the de-noised image (238) to provide the adjusted image (228).

14 Claims, 3 Drawing Sheets

238

228

METHOD AND DEVICE FOR IMAGE NOISE COMPENSATION WITH IMAGE ENHANCEMENT

BACKGROUND

Cameras are commonly used to capture an image of a scene. Unfortunately, some captured images include noise. Currently, there are a number of de-noising techniques used to remove the noise from the captured image. However, these de-noising techniques tend to smooth out both the noise and the details from the captured image. As a result thereof, current de-noising techniques are not completely satisfactory.

SUMMARY

The present invention is directed to a system for providing an adjusted image of a scene from a noisy captured image. The system includes a control system. In certain embodiments, the control system is particularly useful for providing a perceptually pleasant, adjusted image. In one embodiment, the control system creates a de-noised image from the captured image, determines a details layer from the captured image and the de-noised image, and combines information from the details layer with the de-noised image to provide the adjusted image. With this design, the details are added back to the de-noised image to provide the adjusted image. The resulting adjusted image has less noise than the captured image and more details than the de-noised image.

In one embodiment, the control system determines a base layer from the captured image and the de-noised image, and subsequently determines the details layer by subtracting the base layer from the captured image. For example, the control system can determine the base layer by joint bilateral filtering of the noisy captured image and the de-noised image. As a result of the use of the joint bilateral filter, the base layer is more accurate and the resulting details layer is more accurate.

The present invention is also directed to a method for providing an adjusted image of a scene from a noisy captured image. The method can include the steps of (i) creating a de-noised image from the captured image; (ii) determining a details layer from the captured image and the de-noised image; and (iii) combining information from the details layer with the de-noised image to provide the adjusted image.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
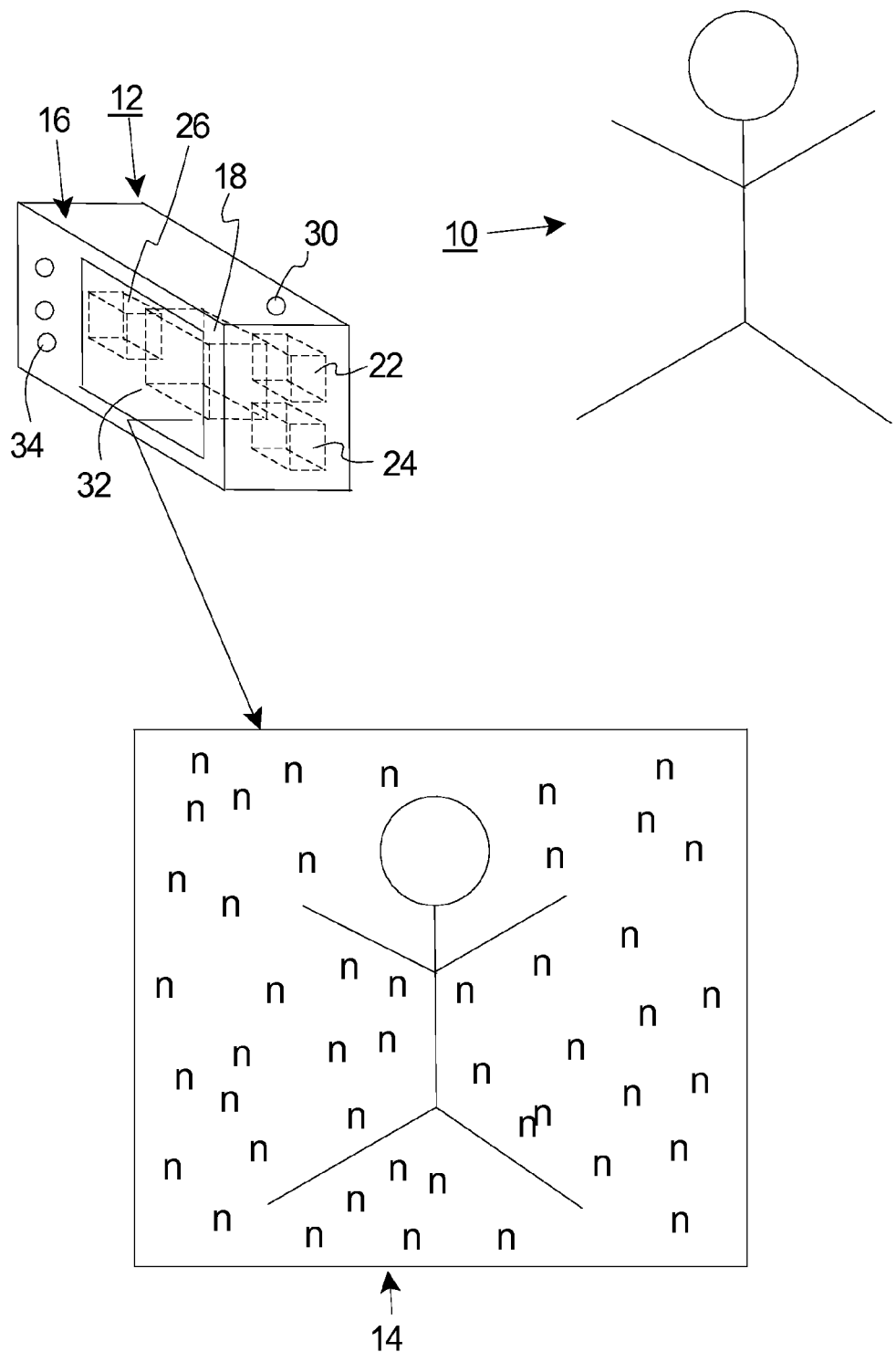
FIG. 1 is a simplified view of a scene, one embodiment of a system having features of the present invention, and a captured image.

FIG. 1 is a simplified view of a scene 10, one embodiment of a system 12 e.g. an image apparatus having features of the present invention, and a captured image 14 that was captured with the image apparatus 12. In this embodiment, the image apparatus 12 is a digital camera that includes an apparatus frame 16, an optical assembly (not shown), a capturing system 18 (illustrated as a box in phantom), a power source 22 (illustrated as a box in phantom), an illumination system (not shown), a storage assembly 24 (illustrated as a box in phantom), and a control system 26 (illustrated as a box in phantom). The design of these components can be varied to suit the design requirements and type of image apparatus 12. Further, the image apparatus 12 could be designed without one or more of these components. For example, the image apparatus 12 could be designed without the illumination system.

As an overview, in certain embodiments, the control system 26 provided herein can provide a relatively high resolution, low noise adjusted image 228 (illustrated in FIG. 2B) from the captured image 14. Stated in another fashion, the control system 26 reduces the noise from the captured image 14 to provide the detailed adjusted image 228. In certain embodiments, the basic idea is to compute a details layer 316 (illustrated in FIG. 3) from the captured image 14, and add the details back to a de-noised image 238 to provide the adjusted image 228.

The type of scene 10 captured by the image apparatus 12 can vary. For example, the scene 10 can include features such as one or more animals, plants, mammals, fish, objects, and/or environments. In FIG. 1, the scene 10 is a simple stick figure.

The apparatus frame 16 can be rigid and support at least some of the other components of the image apparatus 12. In one embodiment, the apparatus frame 16 defines a cavity that receives and retains at least a portion of the capturing system 18, the power source 22, the illumination system, the storage assembly 24, and the control system 26. Further, the optical assembly is fixedly secured to the apparatus frame 16.

The image apparatus 12 can include an aperture (not shown) and a shutter mechanism (not shown) that work together to control the amount of light that reaches the capturing system 18. The shutter mechanism can include a pair of blinds that work in conjunction with each other to allow the light to be focused on the capturing system 18 for a certain amount of time. Alternatively, for example, the shutter mechanism can be all electronic and contain no moving parts. For example, an electronic capturing system can have a capture time controlled electronically to emulate the functionality of the blinds. The time in which the shutter mechanism allows light to be focused on the capturing system 18 is commonly referred to as the capture time or the exposure time. The length of the exposure time can vary. The shutter mechanism is activated by a shutter button 30.

The optical assembly can include a single lens or a combination of lenses that work in conjunction with each other to focus light onto the capturing system 18.

In one embodiment, the image apparatus 12 includes an autofocus assembly (not shown) including one or more lens movers that move one or more lenses of the optical assembly in or out to focus the light on the capturing system 18.

The capturing system 18 captures the captured image 14 during the exposure time. The design of the capturing system 18 can vary according to the type of image apparatus 12. For a digital type camera, the capturing system 18 includes an image sensor (not shown), and a filter assembly (not shown) e.g. a Bayer filter.

The image sensor receives the light that passes through the aperture and converts the light into electricity. One non-exclusive example of an image sensor for digital cameras is known as a charge coupled device ("CCD"). An alternative image sensor that may be employed in digital cameras uses complementary metal oxide semiconductor ("CMOS") technology. Each of these image sensors includes a plurality of pixels.

The power source 22 provides electrical power to the electrical components of the image apparatus 12. For example, the power source 22 can include one or more batteries.

The storage assembly 24 stores the various captured images 14 and/or the adjusted images 228. The storage assembly 24 can be fixedly or removably coupled to the apparatus frame 16. Non-exclusive examples of suitable storage assemblies 24 include flash memory, a floppy disk, a hard disk, or a writeable CD or DVD.

The control system 26 is electrically connected to and controls the operation of the electrical components of the image apparatus 12. The control system 26 can include one or more processors and circuits and the control system 26 can be programmed to perform one or more of the functions described herein.

In certain embodiments, the control system 26 provides the adjusted image 228 using a digital noise reduction algorithm to reduce the noise from the captured image 14. The image noise reduction algorithm is described in more detail below.

Additionally, the image apparatus 12 can include an image display 32 that displays the captured image 14 and/or the adjusted image 228. Additionally, the image display 32 can display other information such as the time of day, and the date. Moreover, the image apparatus 12 can include one or more control switches 34 electrically connected to the control system 26 that allows the user to control the functions of the image apparatus 12.

One or more of the control switches 34 can be used to selectively activate the image noise compensation described herein. Alternatively, the control system 26 can evaluate the captured image 14 or the environmental conditions and the control system 26 can determine when to activate the image noise compensation described herein.

FIG. 1 includes a simplified illustration of the captured image 14. In this example, the captured image 14 includes a plurality of "n's" that represent noise in the captured image 14. In this example, the captured image 14 has a significant amount of noise "n's". Further, the amount of noise ("n's") in the captured image 14 will depend upon the characteristics of the image apparatus 12, the settings of the image apparatus 12, and/or the characteristics of the scene 10. For example, the captured image 14 will contain noise ("n's") if it is underexposed.

Figure 3:
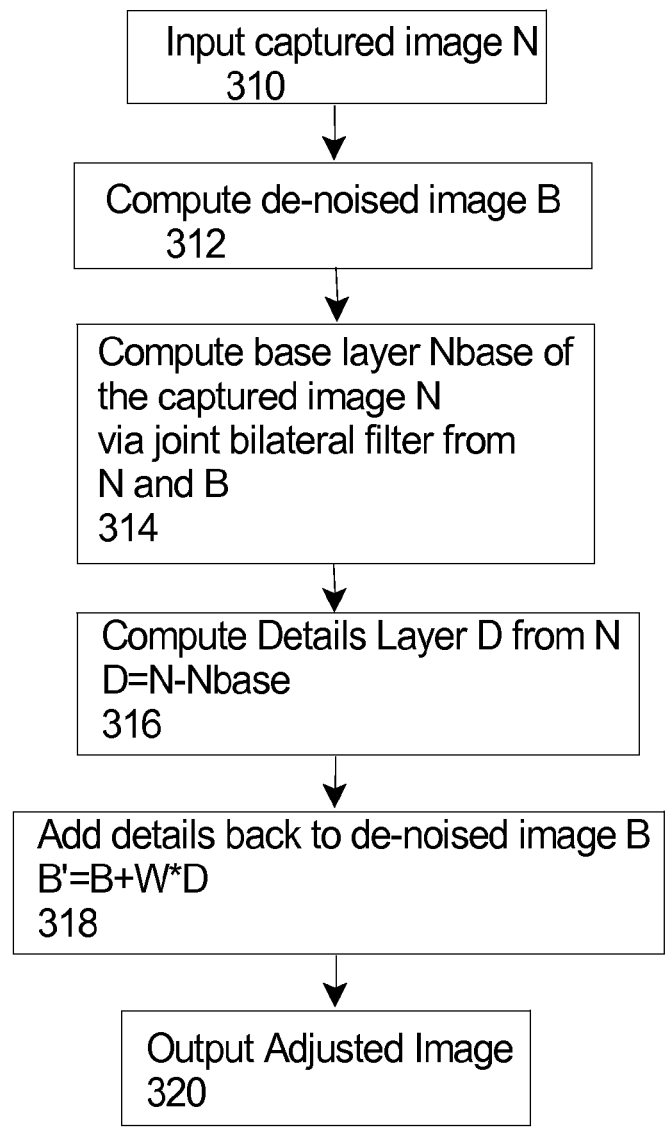
FIG. 3 is a flow chart that illustrates one version of a digital noise reduction approach.

It should be noted that the captured image 14 can be separated into a base layer 314 (illustrated in FIG. 3) and a details layer 316 (illustrated in FIG. 3). The characteristics of the base layer 314 and details layer 316 in the captured image 14 will depend upon the characteristics of the scene 10 that is being captured by the image apparatus 12. Generally, the base layer 314 is the essential structures of the captured image 14, and the details layer 316 is the high frequency structures of the captured image 14. Stated in another fashion, the details layer 316 can be the high frequency components (e.g. the features and edges of the objects) of the captured image 14 and the base layer 314 can be the low frequency components of the captured image 14.

Figure 2A:
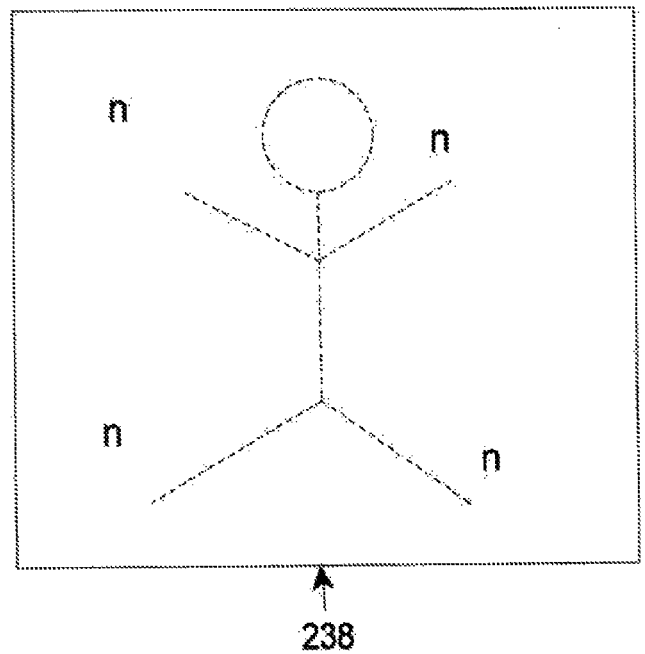
FIG. 2A is a simplified illustration of a de-noised image from the captured image.

FIG. 2A is a simplified illustration of the de-noised image 238 computed and generated from the captured image 14 with the control system 26 using any suitable de-noising technique. One non-exclusive example of a suitable, conventional de-noising technique is a wavelet-based de-noise technique.

Comparing the de-noised image 238 from FIG. 2A with the captured image 14 from FIG. 1, the de-noised image 238 has less noise (fewer "n's") than the captured image 14. However, the de-noised image 238 also has diminished details (illustrated by the stick figure being in phantom) as compared to the captured image 14. As a result thereof, the de-noised image 238 is not completely satisfactory.

As provided herein, the base layer 314 that is obtained from the captured image 14 (illustrated in FIG. 1) and the de-noised image 238 (illustrated in FIG. 2A). Further, the details layer 316 is obtained from the captured image 14 and the base layer 314.

One non-exclusive method used to generate the details layer 316 and the base layer 314 is disclosed herein. More specifically, the base layer 314 can be derived by applying a joint, bilateral filter on the captured image 14 and the de-noised image 238. A suitable joint, bilateral filter is represented in Equation 1 below:

$$N_{base}(N(x); B) = \frac{1}{C(X)} \sum_{x' \in N(x)} G_d(x-x')G_r(B(x)-B(x')) * N(x'). \quad \text{Eq. 1}$$

In Equation 1, (i) N is the noisy original captured image; (ii) $N_{base}$ is the base layer 314 of the noisy original captured image 14; (iii) B is the de-noised image 238; (iv) C is Normalization coefficients; (v) G is a Gaussian function; (vi) x is the pixel being evaluated; (vii) x' is a neighboring pixel to pixel x; (viii) d is the spatial distance between pixels x and x'; and (ix) r represents the range/intensity of the pixel x or x'. The Normalization coefficient is the scale that makes the sum of the filter coefficients equal to one.

Using equation 1, the joint, bilateral filter can be used by the control system 26 to accurately determine the base layer 314 from the captured image 14 and the de-noised image 238.

Subsequently, after the generation of the base layer 314, the details layer 316 can be generated by the control system 26 by subtracting the base layer 314 from the captured image 14. Stated in another fashion, the intensity information of the pixels of the base layer 314 is subtracted from the intensity information of the pixels of the captured image 14 to generate the details layer 316. This is represented by Equation 2:

$$D = N - N_{base} \quad \text{Eq. 2}$$

Where D is the calculated details.

Figure 2B:
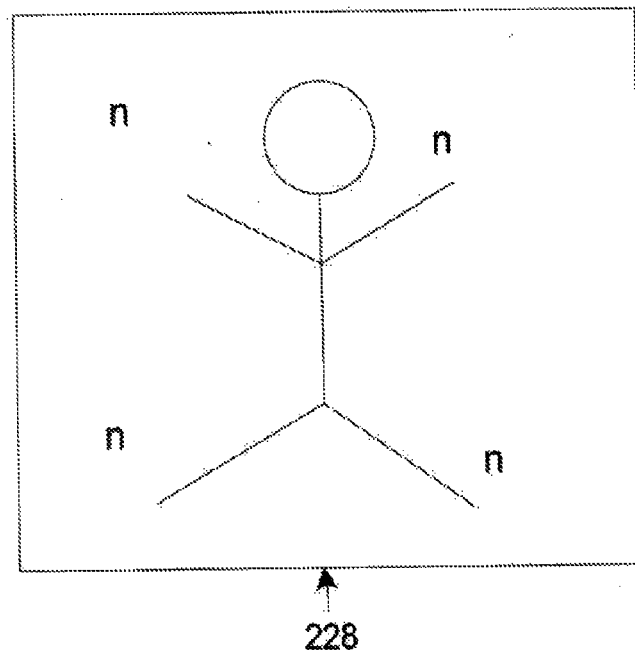
FIG. 2B is a simplified illustration of an adjusted image from the captured image.

FIG. 2B is a simplified illustration of the resulting adjusted image 228 that is generated by control system 26 by blending the details of the details layer 316 with the de-noised image 238. Stated in another fashion, the details layer 316 is added to the de-noised image 238 to generate the adjusted image 228. This is represented in Equation 3:

$$B' = B + W*D. \quad \text{Eq. 3}$$

In this equation, B' represents the adjusted image 228 and W is a non-negative weighting factor. It should be noted that the value of W can be selected to adjust level of details added back to get the adjusted image 228. For example, a relatively low value of W adds only a relatively small amount of details back, while a relatively large value of W adds a greater value of details back. It should be noted that in certain embodiments, the user can adjust the value of W to achieve the desired adjusted image 228. In one non-exclusive embodiment, the value of W can be varied between approximately zero and two.

Comparing the adjusted image 228 from FIG. 2B with the de-noised image 238 from FIG. 2A, the adjusted image 228 has similar noise (same amount of "n's") to the de-noised image 238. However, the adjusted image 228 has greater details (the stick figure is a solid) than the de-noised image 238. Further, comparing the adjusted image 228 from FIG. 2B with the captured image 14 from FIG. 1, the adjusted image 228 has less noise (fewer "n's") than the captured image 14. Further, the adjusted image 228 has a similar amount of details (both stick figures are solid) to the captured image 14.

Thus, with the present invention, the noise has been reduced from the captured image 14 with the control system 26 without losing the details.

FIG. 3 is a flow chart that illustrates one method that can be used to provide the adjusted image from the captured image. At block 310, the noisy captured image N is input into the control system. Next, at block 312, the de-noised image B is computed by the control system from the captured image using conventional de-noising techniques. Subsequently, at block 314, the base layer $N_{base}$ is computed by the control system using the joint, bilateral filter on the captured image N and the de-noised image B. Next, at block 316, the details layer D is computed by the control system by subtracting the base layer from the captured image (D=N−$N_{base}$). Subsequently, at block 318, the control system adds the details D to the de-noised image (B'=B+W*D). Stated in another fashion, the details D and the de-noised image B are blended and merged together to generate the adjusted image 228. Finally, at block 320, the control system generates the adjusted image B'.

Figure 4:
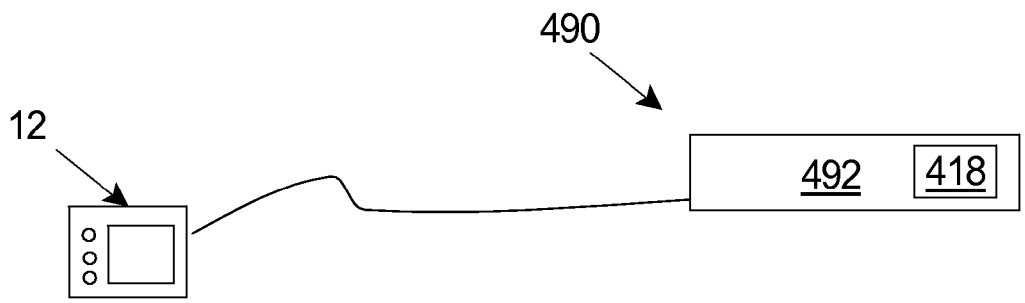
FIG. 4 is a simplified illustration of another system having features of the present invention.

FIG. 4 illustrates another embodiment of a system 490 having features of the present invention. In this embodiment, the system 490 includes a computer 492 that is electrically connected to the image apparatus 12. Further, in this embodiment, one or more of the captured images 14 (not shown in FIG. 4) captured by the image apparatus 12 can be transferred from the computer 492. With this design, a control system 418 of the computer 492 can produce the adjusted image (not shown in FIG. 4) using the methods described above. Alternatively, for example, the image apparatus 12 can be connected to the computer 492 in a wireless fashion.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A system for providing an adjusted image of a scene from a noisy captured image, the system comprising:
a control system that generates a de-noised image from the captured image using a de-noising algorithm; computes a base layer from the captured image and the de-noised image by performing joint bilateral filtering on both the de-noised image and the captured image; computes a details layer by subtracting the base layer from the captured image; and generates the adjusted image by merging the details layer and the de-noised image, the adjusted image having improved detail relative to the de-noised image and less noise relative to the captured image.

2. The system of claim 1 wherein the bilateral filter is represented in the following equation:

$$N_{base}(N(x); B) = \frac{1}{C(X)} \sum_{x' \in N(x)} G_d(x - x')G_r(B(x) - B(x')) * N(x')$$

wherein (i) N is the noisy original captured image; (ii) $N_{base}$ is a base layer of the noisy original captured image 14; (iii) B is the de-noised image; (iv) C is Normalization coefficients; (v) G is a Gaussian function; (vi) x is a pixel being evaluated; (vii) x' is a neighboring pixel to pixel x; (viii) d is the spatial distance between pixels x and x'; and (ix) r represents the range/intensity of the pixel x or x'.

3. The system of claim 1 further comprising a capturing system for capturing the captured image.

4. The system of claim 1 wherein the control system multiplies the details layer by a non-negative weighting factor to adjust the influence of the details layer on the adjusted image during the generation of the adjusted image.

5. The system of claim 4 wherein the non-negative weighting factor is between approximately zero and two.

6. The system of claim 1 wherein the de-noising algorithm includes a wavelet-based de-noising technique.

7. A method for providing an adjusted image of a scene, the method comprising the steps of:
capturing an image of a scene, the image including noise;
generating a de-noised image from the captured image using a de-noising algorithm;
computing a base layer from the captured image and the de-noised image;
computing a details layer by subtracting the base layer from the captured image; and
generating the adjusted image by merging the details layer and the de-noised image, the adjusted image having improved detail relative to the de-noised image and less noise relative to the captured image.

8. The method of claim 7 wherein the step of computing the base layer further comprises the step of performing joint bilateral filtering on both the de-noised image and the captured image.

9. The method of claim 8 wherein the bilateral filter is represented in the following equation:

$$N_{base}(N(x); B) = \frac{1}{C(X)} \sum_{x' \in N(x)} G_d(x - x')G_r(B(x) - B(x')) * N(x')$$

wherein (i) N is the noisy original captured image; (ii) $N_{base}$ is a base layer of the noisy original captured image 14; (iii) B is the de-noised image; (iv) C is Normalization coefficients; (v) G is a Gaussian function; (vi) x is a pixel being evaluated; (vii) x' is a neighboring pixel to pixel x; (viii) d is the spatial distance between pixels x and x'; and (ix) r represents the range/intensity of the pixel x or x'.

10. The method of claim 7 wherein the step of capturing an image includes capturing the image with a capturing system.

11. The method of claim 7 wherein the step of generating the adjusted image includes the step of multiplying the details layer by a non-negative weighting factor to adjust the influence of the details layer on the adjusted image.

12. The method of claim 11 wherein the step of multiplying includes the non-negative weighting factor being between approximately zero and two.

13. The method of claim 7 wherein the step of generating the de-noised image includes the step of generating the de-noised image from the captured image using a wavelet-based de-noising technique.

14. The method of claim 7 wherein the step of capturing includes the step of capturing only a single image of the scene.

* * * * *